Sept. 6, 1955 A. J. GOTTSTEIN 2,717,171
CONTAINER-CARRYING DEVICE
Filed Jan. 22, 1952
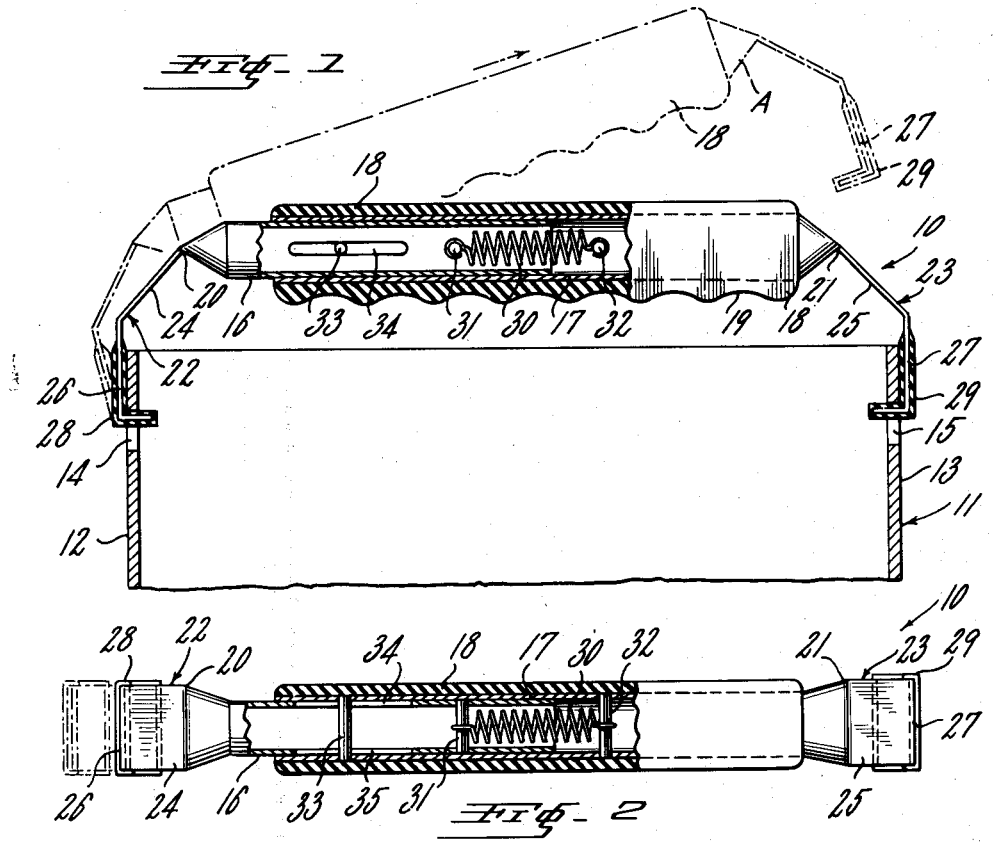
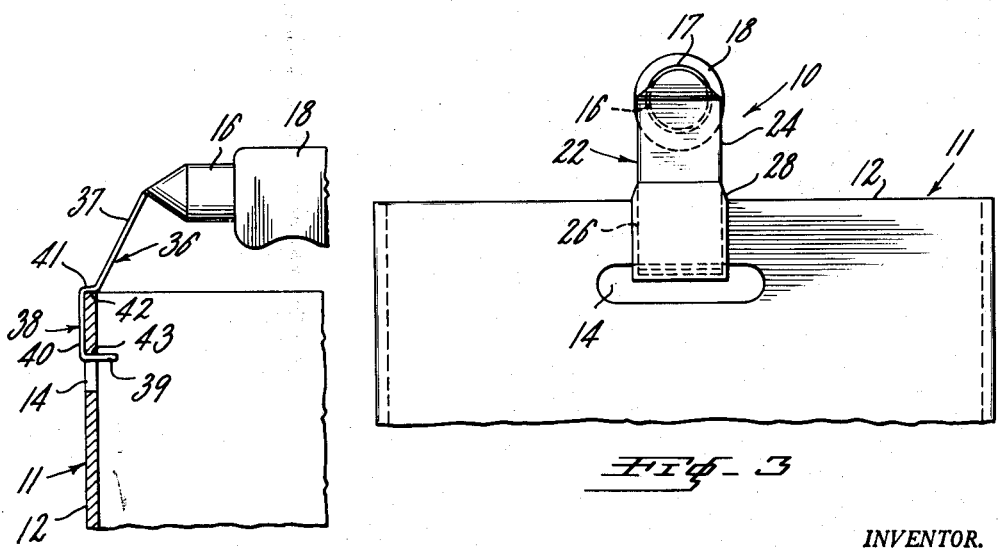
INVENTOR.
ADOLPH J. GOTTSTEIN
BY Morton Amster
ATTORNEY

United States Patent Office 2,717,171
Patented Sept. 6, 1955

2,717,171
CONTAINER-CARRYING DEVICE
Adolph J. Gottstein, Woodbridge, N. J.

Application January 22, 1952, Serial No. 267,634

2 Claims. (Cl. 294—16)

The present invention relates to article-handling devices, and more particularly to a handle attachment for lifting cases and similar receptacles.

In handling a number of smaller articles of packaged merchandise, it is often expedient to place such articles in a larger case for movement as a single larger unit. For example, milk, carbonated beverages, beer and the like are packaged in containers or bottles and then placed in a case or carton for delivery to the home or to commercial establishments.

Various types of detachable handles have heretofore been employed for lifting and carrying about such cases. However, none of these handles meet the particular requirements of an individual, such as a milk man, who repeatedly lifts and moves cases from place to place. For such repeated use it is essential that the handle be readily attachable to and detachable from a case or receptacle. Preferably, the individual should be able to effect the attachment to the case and detachment therefrom by one hand, thereby leaving the other hand free for manipulating other cases or for carrying loose articles. Further, upon being attached to the case, the handle should be maintained in position on the case against accidental or inadvertent disengagement. In addition to the foregoing requirements, it is particularly advantageous to have a single handle attachment which can be readily adjusted to fit cases of varying sizes and shapes.

Accordingly, it is an object of the present invention to provide a handle attachment which is particularly suitable for vocations requiring the repeated lifting and carrying about of unwieldy objects.

It is another object of the present invention to provide a handle attachment which can be readily attached to and detached from a case with equal facility and rapidity.

It is a further object of the present invention to provide a simple handle structure which can be manipulated with one hand for application to and removal from cases of varying sizes and shapes.

A still further object of this invention is to provide a detachable handle structure which, when once applied to a case, is maintained against accidental or inadvertent displacement until such time as the handle is intentionally removed from the case.

A still further object of the present invention is to provide a detachable handle constructed to permit the handling of cumbersome and bulky articles, such as cases for milk bottles or containers, with ease and without physically exerting the milkman.

The foregoing objects, and others which may appear from the following brief description, are attained in accordance with the principles of the present invention by the provision of a handle attachment for lifting cases including a pair of tubular handle members telescopically mounted for adjustment relative to each other. Each of the handle members carries a hook which is adapted to be engaged with the case. The hooks are movable toward and away from each other in response to movement of the handle members and are adjusted in accordance with the length of the case to which the handle is applied. A suitable spring is connected to the handle members for biasing the hooks toward each other and into an inoperative position wherein the hooks are spaced apart a distance somewhat less than the length of the smallest case which is to be lifted by the handle. Accordingly, to apply the handle to a case, the hooks must be moved apart, thereby placing the spring under tension and subsequently maintainnig the handle in place on the case until the hooks are removed from the case. Due to the materially simplified construction, the handle attachment can be applied and removed by using only one hand and is automatically adjustable to cases of varying sizes.

The above objects and brief description will become readily apparent upon reference to the following detailed description when taken in conjunction with the drawing, wherein:

Fig. 1 is a side elevational view, with parts broken away and shown in section, of a handle attachment according to the present invention;

Fig. 2 is a top plan view of the handle attachment of Fig. 1, with parts broken away and shown in section;

Fig. 3 is an end elevational view of the handle attachment viewed from the left of Figs. 1 and 2; and Fig. 4 is a fragmentary side elevational view of a modified form of handle attachment constructed according to the present invention.

Referring now to Figs. 1 to 3 of the drawing, there is shown a preferred embodiment of the handle attachment 10 according to the present invention, which may be fabricated of any suitable, light and durable material. The attachment 10 is shown in adjusted position on a case 11 of the type having opposite walls 12, 13 provided with finger receiving slots 14, 15.

The attachment 10, which may be applied to or removed from the case 11 by one hand, includes a pair of extensible tubular handle members 16, 17 mounted for movement relative to each other. As illustrated, the handle members 16, 17 are telescopically mounted for longitudinal adjustment with the handle member 16 conformably received within the handle member 17. Preferably the outer handle member 17 is provided with a grip 18 of a rubber-like or plastic material which can be firmly grasped to facilitate manipulation of the handle members 16, 17. The grip 18 may be formed with longitudinally spaced finger depressions 19 to prevent slippage of the hand along the grip 18 when the handle member 17 is being adjusted.

Secured to or formed integrally with the outer ends 20, 21 of the handle members 16, 17 are the case-engaging elements 22, 23 which are movable toward and away from each other in response to the adjustment of the handle members 16, 17 relative to each other. The case-engaging elements 22, 23 are of like structure and include downwardly inclined supporting shanks 24, 25 carrying depending L-shaped hooks 26, 27. These hooks are adjustable in accordance with the length of the case to which the handle adjustment 10 is to be applied. The hooks 26, 27 are preferably provided with friction increasing shoes 28, 29 to enhance the gripping qualities of the hooks. As clearly shown in Fig. 1, the shoes 28, 29 may take the form of rubber coatings which provide area bearing contacts against adjacent portions of the walls 12, 13 of the case 11 and against upper bounding portions of the respective finger receiving slots 14, 15 after proper adjustment of the handle attachment 10. Other suitable means for increasing the tenacity of the hooks 26, 27 relative to the case 11 may be employed and are readily apparent to one skilled in the art.

Disposed within the handle members 16, 17 is a spring 30 which is operatively connected to the handle members 16, 17 for biasing them toward each other. The spring 30 has one end connected to the handle member 16 by means of a pin 31, and has the other end connected to the handle member 17 by means of a pin 32. These pins 31, 32 extend transversely of the respective handle members 16, 17 and are secured thereto in any suitable manner, such as forced fitting into complementary apertures, welding, or riveting. The spring 30 normally biases the handle members 16, 17 into an inoperative position wherein the hooks 26, 27 are spaced apart a distance somewhat less than the length of the case which is to be lifted by the handle attachment 10. Accordingly, when the L-shaped hooks 26, 27 are engaged within the respective slots 14, 15, the spring 30 is placed under tension and urges the hooks 26, 27 into bearing engagement with the adjacent surfaces of the walls 12, 13. In this manner, the attachment 10 is firmly held in an adjusted position straddling the case which is to be moved.

Suitable interengaging means are provided on the handle members 16, 17 to maintain the handle members against rotation with respect to each other during their longitudinal adjustment. As illustrated in Figs. 1 and 2, the handle member 17 carries a transverse pin 33 which guidingly engages opposed longitudinally extending slots 34, 35 provided in the handle member 16. The pin 33 further cooperates with the slots 34, 35 to limit the movement of the handle members 16, 17 toward each other under the influence of spring 30 and away from each other against the force exerted by the spring.

In use, the attachment can be applied to a case by a simple manual manipulation requiring a minimum amount of time and effort. Preferably the grip 18 is grasped in one hand and the device brought into an inclined position, illustrated in phantom in Fig. 1 and designated by the letter A, whereupon the hook 26 of the case engaging element 22 can be inserted in the finger receiving slot 14. The handle member 17 is then extended until the hook 27 of the case-engaging element 23 can be inserted in the finger-receiving slot 15. Upon releasing the handle member 17, the spring 30 causes the hooks 26, 27 to bear against the opposite walls 12, 13 of the case 11 thereby preventing displacement of the handle attachment 10 until intentionally removed.

To effect the removal of the handle attachment 10, it is merely necessary to again grasp the grip 18 of handle member 17 and disengage hook 27 from the adjacent slot. Upon moving the attachment into the inclined position A, the hook 26 can be readily disengaged from slot 14, and the attachment is freed for application to a further case of the same or different size.

When constructing the attachment, spring 30 is selected to provide the desired holding effect and yet permit ready manipulation of the device without requiring the case to be held in place. Further, the spacing of the hooks 26, 27 with respect to the handle members 16, 17 is adjusted in accordance with the overall height of the articles being carried within the case 11. If, for example, the articles do not project upwardly of the open top of the case 11, the handle members 16, 17 can be positioned with just sufficient clearance to permit the grip 18 to be readily grasped.

In Fig. 4, there is shown a modification for the respective case-engaging or gripping elements 22, 23 of the handle attachment 10. The modified case-engaging elements 36 each include a supporting shank 37 which carries an L-shaped hook 38 having a horizontal leg 39 and a vertical leg 40. The hook 38 is offset outwardly of the lower end of the shank 37 by means of an interconnecting shoulder 41 which dependingly supports the hook 38. This shoulder is substantially parallel to the horizontal leg 39 of the hook 38 and embracingly engages the upper edge 42 of the case 11 when the horizontal leg 39 is brought into engagement with the upper bounding wall 43 of slot 14. Accordingly, upon application of the handle attachment 10 in the manner previously described, the case 11 is firmly gripped by hooks 38 and shoulders 41 of the elements 36.

Numerous other modifications may be made without departing from the scope of the present invention as defined in the appended claims.

Having now described my invention, what I claim as new and desire to secure by Letters Patent, is:

1. A lift attachment securable to a case having upstanding walls formed at locations spaced from the upper wall edges with opposed finger-receiving slots comprising a pair of tubular members telescopically mounted one within the other for movement relative to each other, the outermost one of said tubular members serving as a handle for said attachment, gripping means dependingly supported from said extensible members and operatively engaging said case for holding said tubular members in straddling relation to said case, said gripping means each including a planar frictional abutment adapted to provide an area bearing and friction contact against the outer face of the adjacent upstanding wall and an inwardly-extending hook receivable within the adjacent finger-receiving slot, the length of said planar frictional abutments being selected in relation to the location of said finger-receiving slots to maintain said tubular members spaced above the upper edges of said upstanding walls, and resilient means operatively connected to said extensible members and biasing said gripping means into operative engagement with said case.

2. A lift attachment securable to a case having upstanding walls formed at locations spaced from the upper wall edges with opposed finger-receiving slots comprising a pair of tubular members telescopically mounted one without the other for movement relative to ecah other, the outermost one of said tubular members serving as a handle for said attachment, gripping means dependingly supported from said extensible members and operatively engaging said case for holding said tubular members in straddling relation to said case, said gripping means each including a planar frictional abutment adapted to provide an area bearing and friction contact against the outer face of the adjacent upstanding wall and an inwardly-extending hook receivable within the adjacent finger-receiving slot, a shoulder spaced from said hook and engageable over the adjacent upper wall edge of said case, the length of said planar frictional abutments being selected in relation to the location of said finger-receiving slots to maintain said tubular members spaced above the upper edge of said upstanding walls, and resilient means operatively connected to said extensible members and biasing said gripping means into operative engagement with said case.

References Cited in the file of this patent

UNITED STATES PATENTS

| | | |
|---|---|---|
| 609,933 | Hahn et al. | Aug. 30, 1898 |
| 755,044 | Rafield | Mar. 22, 1904 |
| 1,655,744 | Swanby | Jan. 10, 1928 |
| 1,832,409 | Mueller | Nov. 17, 1931 |
| 2,093,658 | Hildenbrand | Apr. 9, 1937 |
| 2,198,244 | Chapman | Apr. 23, 1940 |
| 2,396,479 | Votaw | Mar. 12, 1946 |
| 2,510,596 | Murphy | June 6, 1950 |
| 2,559,190 | Hallstream | July 3, 1951 |